United States Patent [19]
Cates

[11] Patent Number: 5,935,434
[45] Date of Patent: Aug. 10, 1999

[54] IN-LINE PIPE COUPLING AND FLUID STRAINER APPARATUS

[75] Inventor: James R. Cates, Hillsborough, N.C.

[73] Assignee: Cates Propane Plant Construction, Inc., Hillsborough, N.C.

[21] Appl. No.: 09/025,200

[22] Filed: Feb. 18, 1998

[51] Int. Cl.⁶ .................................................. B01D 29/01
[52] U.S. Cl. ..................... 210/232; 210/445; 210/446; 210/451; 137/550; 285/187; 285/397
[58] Field of Search .................................. 210/767, 136, 210/232, 435, 445, 446, 451; 137/550; 285/187, 397

[56] References Cited

U.S. PATENT DOCUMENTS

| 504,438 | 9/1893 | Messler . | |
|---|---|---|---|
| 2,419,453 | 4/1947 | Kocevar . | |
| 2,532,146 | 11/1950 | Cahenzli | 210/162 |
| 2,816,573 | 12/1957 | Kaddis et al. . | |
| 4,052,779 | 10/1977 | Hunter | 29/429 |
| 4,170,556 | 10/1979 | Pall . | |
| 5,284,586 | 2/1994 | DeSalvo | 210/448 |
| 5,407,214 | 4/1995 | Lew et al. . | |
| 5,766,469 | 6/1998 | Boast et al. . | |

*Primary Examiner*—Jay H. Woo
*Assistant Examiner*—Fred Prince
*Attorney, Agent, or Firm*—Olive & Olive, P.A.

[57] ABSTRACT

A strainer apparatus capable of being installed within an Acme type coupling of the kind used in a pipe connecting a transport gas tank to a gas storage tank comprises a perforated disc and a retainer ring. The outer surface of the retainer ring has a smooth portion and an adjacent knurled portion. The disc acts as a strainer and is permanently fixed inside of the Acme coupling by means of the retainer ring knurled portion being press fitted against the inner surface of a coupling counterbore within which both the disc and ring are installed. The Acme coupling after being fitted within the strainer disc is installed in the pipe line leading between a gas transport tank and a gas storage tank to prevent debris from being pumped through the pipe coupling and towards and possibly to the gas storage tank.

6 Claims, 6 Drawing Sheets

IN-LINE PIPE COUPLING AND FLUID STRAINER APPARATUS

BACKGROUND OF THE INVENTION

1. Field of the Invention

This invention relates generally to strainers which are installed within a pipe coupling. More specifically the invention relates to an apparatus and method for preventing debris, such as small gravel, from being pumped through a pipe coupling connected on one side to a propane gas delivery truck and on the opposite side to a gas storage tank.

2. Description of the Related Art

Gas storage tanks are used extensively to store gas, such as propane, for both residential and commercial use. Once the gas inside of the storage tank has been consumed, or is at least substantially consumed, a gas tank on a delivery truck is connected to the gas storage tank, which then pumps gas into the storage tank to replenish the supply of gas.

FIG. 1 shows a typical prior art system 15 in which a gas delivery truck 24 is shown delivering gas from the truck tank 22 to a permanent gas storage tank 20. In this typical system 15, the gas storage tank 20 connects to a gas intake line 26 that serves as a portion of the gas passage between the truck tank 22 and the storage tank 20. Line 26 typically comprises a stationary metal pipe and has a connector 28 on one downstream end which connects to the gas storage tank 20. The other upstream end of the intake line 26 has a large so-called "Acme" connector 30, exemplified for example by the Acme connector, part number M503-16, which is manufactured by Fisher and Rego, and is, by way of example, used for illustration in the drawings. The phase "Acme connector" is a trade term which refers to a connector having a particular kind of screw thread. It is commonly known in the gas storage tank industry to call connectors with acme type threads "Acme connectors." By way of example, the acme-type threads of Acme connector 30 are shown in FIG. 2 and FIG. 4 at the intake end 60 of Acme connector 30. A back check valve 32 is located in the intake line 26 between the Acme connector 30 and the storage tank 20. The back check valve 32 is commonly known in the art and has a resilient spring that allows the valve to open under pressure and close in the absence of such pressure. When gas is being pumped into the gas tank 20, the pressure from the flowing gas causes the back check valve 32 to open and allow gas to be pumped into the gas storage tank 20. Once gas is no longer being pumped, the pressure from the gas inside of gas tank 20 forces the back check valve into a closed position and stops gas flow out of tank 20.

The gas storage tank 20 also connects to a gas vapor line 40 which is typically a metal pipe of substantially the same length as the intake line 26 but generally smaller in diameter. The vapor line 40 has a connector 42 on one downstream end which connects to the gas storage tank 20. The other upstream end of the gas vapor line 40 has a small Acme connector 44 exemplified by the Acme connector made under part number M-217 by Fisher and Rego, and is, by way of example, used for illustration in the drawings. The vapor line 40 acts to suck gas vapors from the gas storage tank 20 and into the tank 22 on the gas delivery truck 24 when pumping gas into the gas storage tank 20. Gas vapors that remain in the storage tank 20 while pumping gas into the storage tank 20 will exert an opposing force against the gas being pumped into the storage tank 20. Therefore, removing the vapors from the gas storage tank 20 allows the gas to be pumped into the storage tank 20 at a faster rate. An overflow valve 46 is located in the vapor line 40 between the gas storage tank 20 and the small Acme connector 44 to release the overflow of excess gas that might be pumped into the gas storage tank 20.

The gas delivery truck 24 has a discharge hose 48 with a hose coupling connector 31 that through a threaded connection mates to the larger size Acme connector 30 on the intake line 26 for pumping gas from truck tank 22 into the gas storage tank 20. A second hose 50 extends from the gas delivery truck tank 22 and is similarly joined through a hose coupling connector 45 to the smaller size Acme connector 44 on the vapor line 40.

FIG. 2 shows a perspective view of the Acme connector 30 disconnected from the intake line 26 of the gas storage tank 20 and vertically positioned for purpose of illustration with its intake end 60 and exhaust end 62 in upright positions rather than in their normal operational positions as in FIG. 1. The outer threaded intake end 64 of Acme connector 30 releasably mates with the discharge hose coupling connector 31 on the gas discharge hose 48. Gas enters the Acme connector 30 through its intake end 60 and exits through its exhaust end 62. The outside threaded exhaust end 66 of connector 30 releasably mates with a threaded end of the intake pipeline 26 that runs to the gas storage tank 20. A middle portion of the outer surface of the Acme connector 30 forms a hexagonal shape 68 providing flat surfaces for purposes of gripping the Acme connector 30 by means of an appropriate wrench or other tool when installing connector 30 in the pipeline. The intake end 60 of connector 30 includes a first counterbore 70 with a first smooth cylindrical surface of a first uniform internal diameter D-1 (FIG. 4). The first counterbore 70 extends inwardly and terminates substantially in the middle portion of the Acme connector 30 as seen for example in FIG. 4. The exhaust end has a second counterbore 72 which is concentric with but smaller than the first counterbore 70 and forms a second smooth cylindrical surface of a second uniform internal diameter D-2 (FIG. 4). An inwardly sloping planar annular surface 74 (FIG. 4) joins the inner end of the first counterbore 70 to the inner end of the second counterbore 72. FIGS. 2–4 illustrate further details of the Acme connector 30 used by way of example and which will be further described in later description. The Acme connector 30 is typically made of brass.

A common problem with the prior art Acme type connector as has been described above is that small debris such as gravel, bolts, nuts, pump debris and the like will often, for various reasons, accumulate inside of the gas discharge hose 48 before it is attached to the Acme connector 30. For example, the end of the discharge hose 48 might accidentally touch the ground before it is connected to the Acme connector 30, thereby trapping debris inside of the hose 48. Assuming that such small debris is trapped inside of the hose 48 before it is connected to the Acme connector 30, the debris will be pumped towards and most likely into the gas storage tank 20. Once pumping of gas into storage tank 20 commences, such debris can also damage the back check valve 32 and make it inoperable and create potentially hazardous conditions. For example, gravel might lodge in the back check valve 32 while in an open position during pumping of gas into the storage tank 20 and thus prevent the back check valve 32 from closing at the completion of pumping gas into the gas storage tank 20. If the back check valve 32 does not close, then gas from inside of storage tank 20 may leak out into the atmosphere and thus create other potentially dangerous conditions.

Since the later described invention uses a press fitting method, mention is made that it has been known to secure a disc in a connector by press fitting a plug in the connector immediately above the disc as shown in U.S. Pat. No. 4,052,779. However, so far as applicant is aware, it has not been known to provide an annular ring having an outer external surface with both a smooth outer surface portion that loosely but snugly fits into a counterbore within an Acme connector and a knurled outer surface of slightly larger diameter and press fitting the knurled surface of the ring into a tight fit within the connector and using the ring to permanently secure a strainer disc in place within the Acme connector.

An object of the present invention is thus to provide an apparatus and method by means of which the potentially hazardous conditions referred to above can be eliminated.

A more specific object of the invention is to provide an apparatus and method enabling an Acme connector of the type described above to be retrofitted with a permanently fixed strainer located in the path of flow through the connector and in a manner which requires no modification of the connector itself.

Another more specific object of this invention is to provide an annular retainer ring having an outer substantially smooth external surface adjacent a knurled surface of slightly larger diameter and press fitting the knurled portion within a smooth cylindrical surface area of an Acme connector counterbore so as to permanently secure a strainer disc within the connector.

Another object is to provide a method utilizing a setting tool by means of which either of two sizes of retainer rings can be permanently fixed within either of two sizes of Acme connectors.

Other objects will become apparent as the description proceeds.

SUMMARY OF THE INVENTION

The apparatus of the present invention basically comprises a disc like strainer, a retainer ring and a setting tool. According to the method of the invention, the strainer is loosely fitted within the larger of two counterbores in an Acme connector and is held in position by means of the retainer ring and use of the setting tool to press the retainer ring into position. The strainer once installed enables the Acme connector to stop debris from being pumped through the Acme connector and towards and possibly to and through a check valve to the gas storage tank when pumping gas from the gas delivery truck tank to the gas storage tank. The strainer and retainer ring are press fitted inside of the Acme connector by using a uniquely formed setting tool capable of supplying the necessary force to permanently fix the strainer and retainer ring inside of the Acme connector.

DETAILED DESCRIPTION OF THE INVENTION

Figure 1:
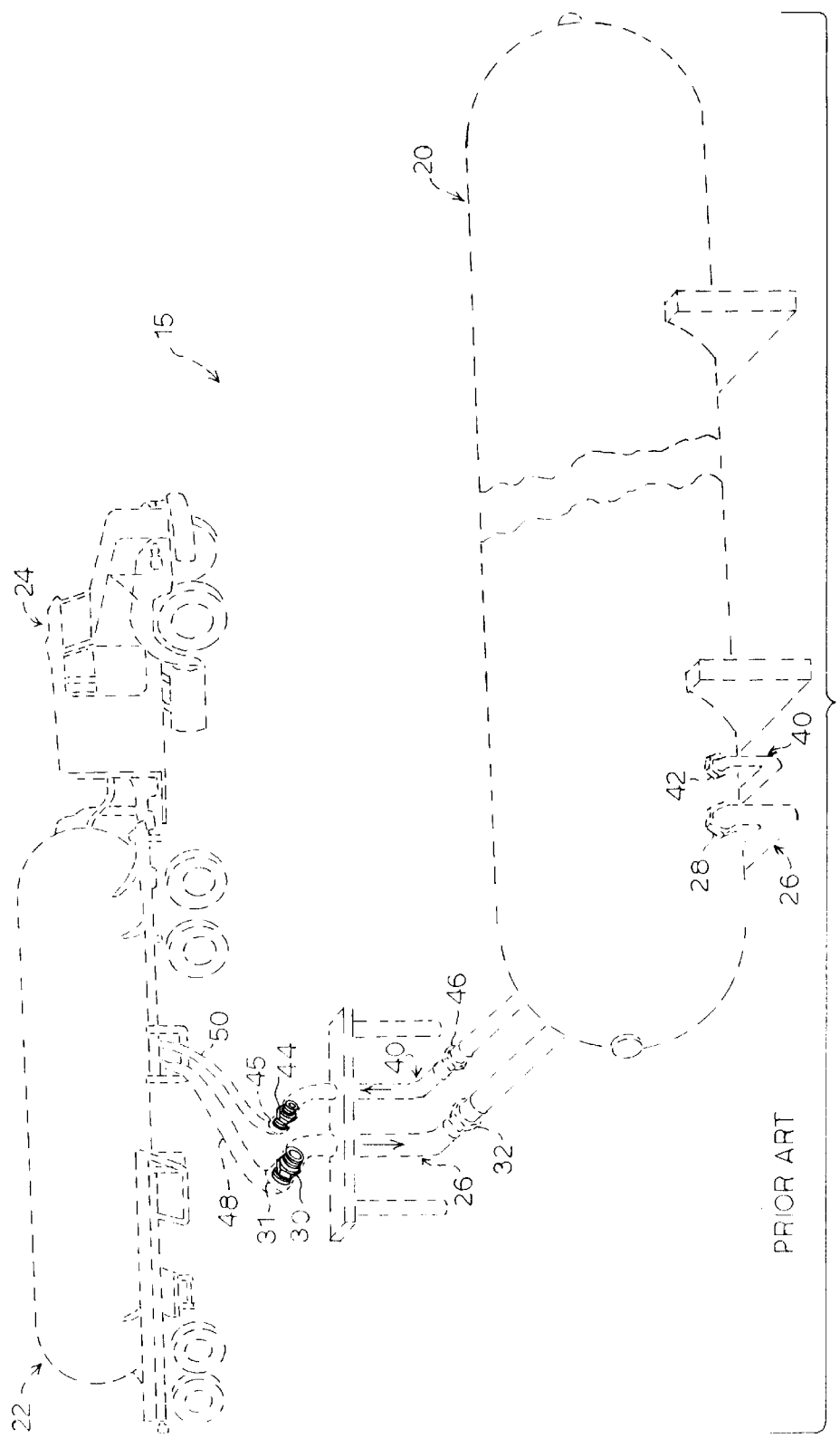
FIG. 1 shows the prior art arrangement of a typical gas delivery truck with its gas tank connected to a gas storage tank to replenish the supply of gas in the storage tank.
Figure 2:
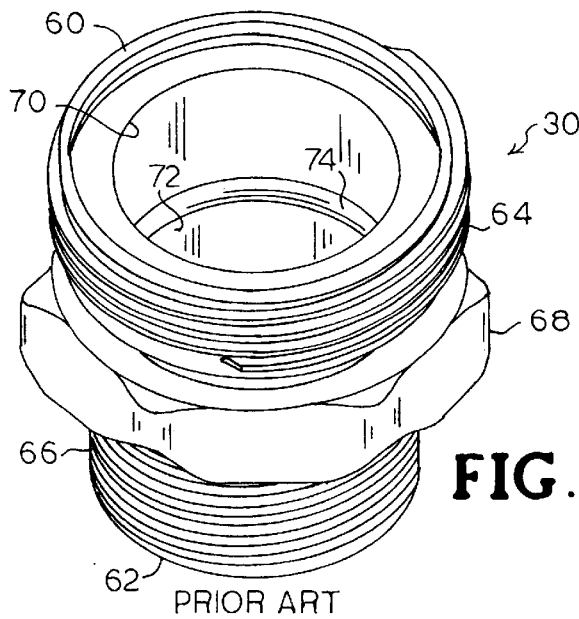
FIG. 2 is a perspective view of the Acme connector shown in FIG. 1 but positioned upright for purpose of illustration rather than in its normal operational position.
Figure 3:
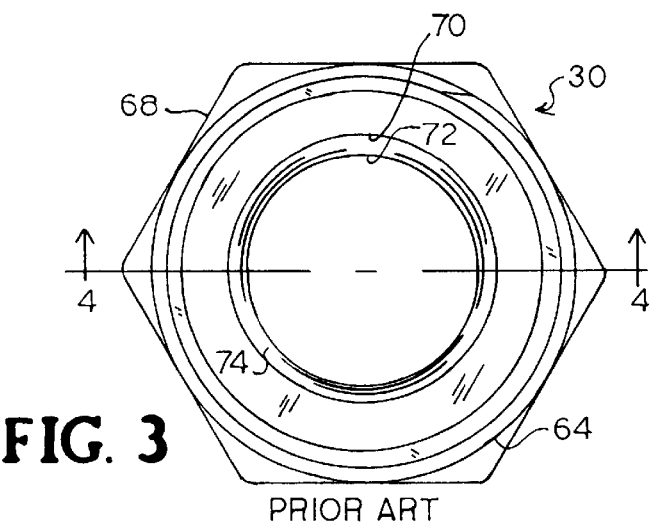
FIG. 3 is a top plan view of the Acme connector shown in FIG. 2.
Figure 5:
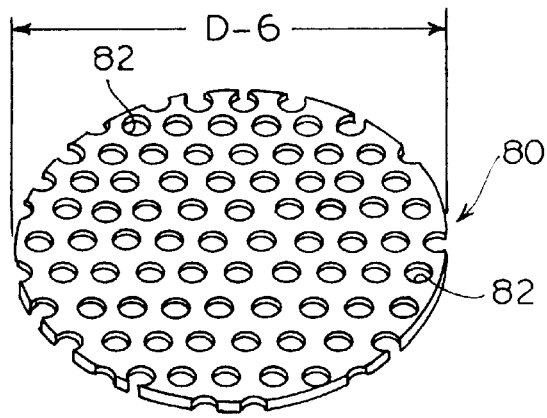
FIG. 5 is a perspective view of the perforated disc strainer of the invention.

FIG. 5 shows a perspective view of the flat relatively thin, rigid perforated disc 80 of the invention. The disc 80 is annular in shape and has a plurality of holes 82 that are uniform in size. In the illustrative embodiment being described by way of example, disc 80 is made of stainless steel, .0156 inches thick and each hole 82 is approximately 0.09375 inches in diameter. The combined area space of the holes in the disc is approximately 63% of the total area space of the disc. The disc 80 is designed so that it will not substantially decrease the rate at which gas is normally pumped into the storage tank 20. Also to be noted is the fact that in the prior art arrangement, gas must flow through the back check valve 32 before entering the storage tank 20 (FIG. 1). The back check valve 32 effectively controls the rate at which gas is pumped into the storage tank 20 by means of the amount of open area created in the back check valve 32 when the back check valve 32 is open. The invention recognizes this effect of the back check valve 32 and the disc 80 is designed so that the combined total area space of the holes in the disc 80 at least slightly exceeds the total open area of the back check valve 32 when the back check valve is open. Since gas cannot be pumped into the gas storage tank 20 any faster than the back check valve 32 will allow the gas to flow, the disc 80 is designed so that gas flows through the disc 80 at a rate that is equal to or faster than the rate at which the gas flows through the back check valve 32.

Figure 6:
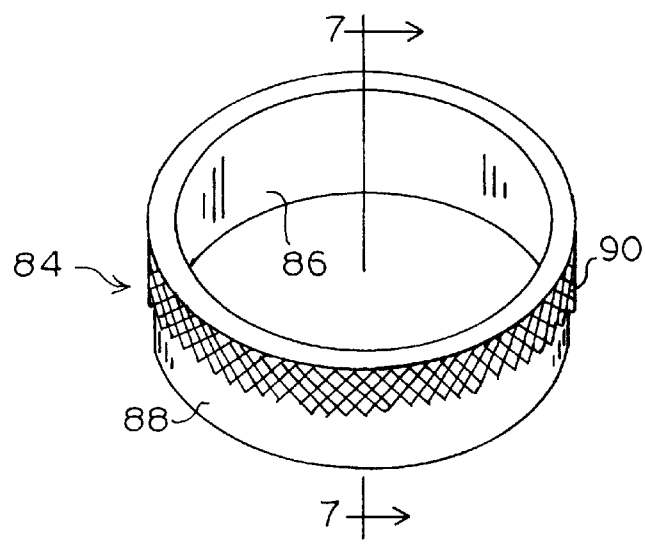
FIG. 6 is a perspective view of the annular retainer ring of the invention.
Figure 7:
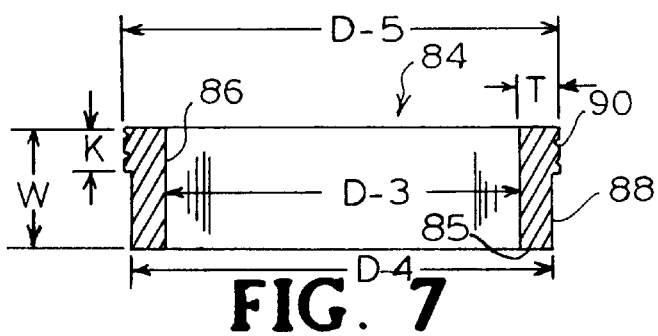
FIG. 7 is a cross-sectional view taken along line 7—7 of FIG. 6 of the annular retainer ring with the later described outside knurled surface portion being exaggerated for purposes of illustration.
Figure 9:
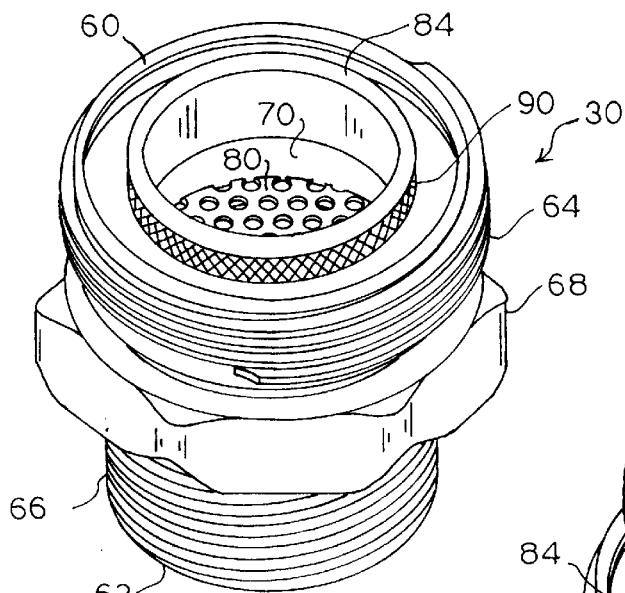
FIG. 9 is a perspective view of the Acme connector and showing the strainer disc placed on the inwardly sloping annular surface of the Acme connector with the smooth portion of the retainer ring sitting loosely inside of the Acme connector counterbore and supported by the outside knurled surface portion of the retainer ring before being press fitted into the Acme connector.

FIG. 6 shows the annular retainer ring 84 of substantially uniform width W (FIG. 7) and uniform thickness T and which in the embodiment used for illustration is made of aluminum. The retainer ring 84 has a uniform internal diameter D-3 bounded by a smooth internal cylindrical surface 86. The bottom portion 88 of the external surface of the retainer ring 84 has a smooth surface 88 whose diameter D-4 substantially equals the diameter D-1 of the first counterbore 70 of the Acme connector 30 to provide a close sliding fit as seen in FIG. 9. While the space between the inner surface of counterbore 70 and the smooth surface 88 of retainer ring 84 is simply enough to provide a sliding fit, this space is made visible in FIGS. 12 and 13 and designated as space S. Adjoining the external smooth surface 88 of the retainer ring 84 is an outer knurled surface portion 90, whose external diameter D-5 is only slightly in excess of the diameter of the smooth surface 88 of the retainer ring 84 as seen exaggeration for purposes of illustration in FIG. 7.

In one embodiment utilizing an Acme connector 30 modified according to the invention and fitted to intake line 26, the counterbore 70 had an internal diameter D-1 of 2.125 inches, the retainer ring 84 outer diameter D-4 was 2.120 inches, the retainer ring 84 outer diameter D-5 was 2.135 inches, the inner diameter D-3 of the retainer ring 84 was approximately 1.875 inches, the thickness T of retainer ring 84 was approximately 0.09375 inches, the width W was approximately .0625 inches and the width W of the outer knurled surface portion was approximately 0.21875 inches.

Figure 10:
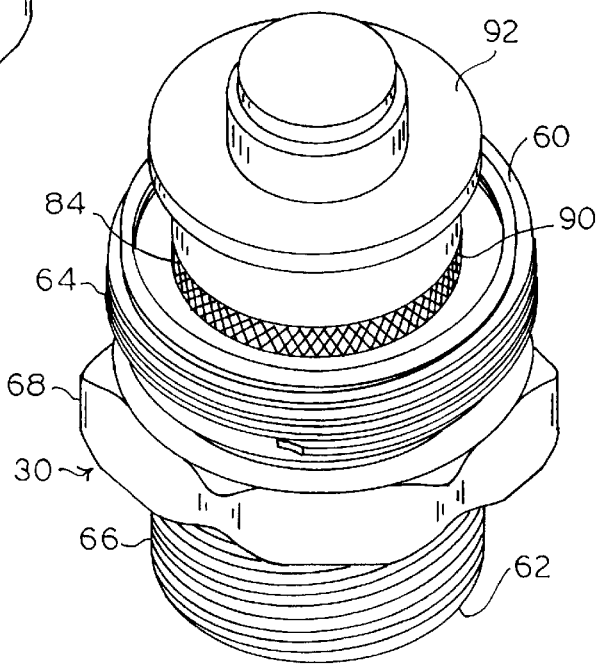
FIG. 10 is a view similar to FIG. 9 but showing the setting tool placed in position over the retainer ring and positioned ready to press fit the retainer ring within the Acme connector.
Figure 11:
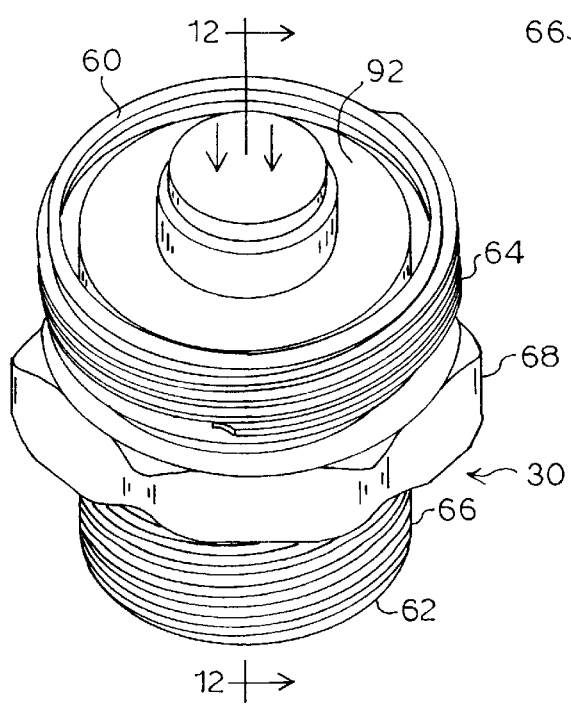
FIG. 11 is a perspective view of the Acme connector showing the setting tool in the process of press fitting the retainer ring within the Acme connector.

The invention recognizes that particularly during start-up, when pressures are being equalized small debris may be forced through either the Acme connector 30 or the 25 Acme connector 44 (FIG. 1). In this regard, the invention also recognizes that Acme connector 30 used in intake line 26 is typically of smaller size than Acme connector 44 used in vapor line 40 and provides a setting tool 92 (FIG. 8) uniquely adapted to install either a small or a large size strainer disc strainer like disc 80 or a smaller or large size retainer ring, formed like retainer ring 84 to fit into a correspondingly small size Acme connector 44 or large size Acme connector 30 as seen in FIG. 1. Thus, diameter D-7 (FIG. 12) of setting tool 92 fits into a large size retaining ring 84 and diameter D-8 of setting tool 92 fits into the large size counterbore 70 whereas when setting tool 92 is reversed from the position shown in FIGS. 8, 10, 11 and 12, diameter D-9 is designed to fit into a relatively small size counterbore and diameter D-10 is designed to fit into a relatively small size retainer ring but in the same manner as illustrated in FIG. 11. In the embodiment being described, setting tool 92 was formed of aluminum.

Figure 4:
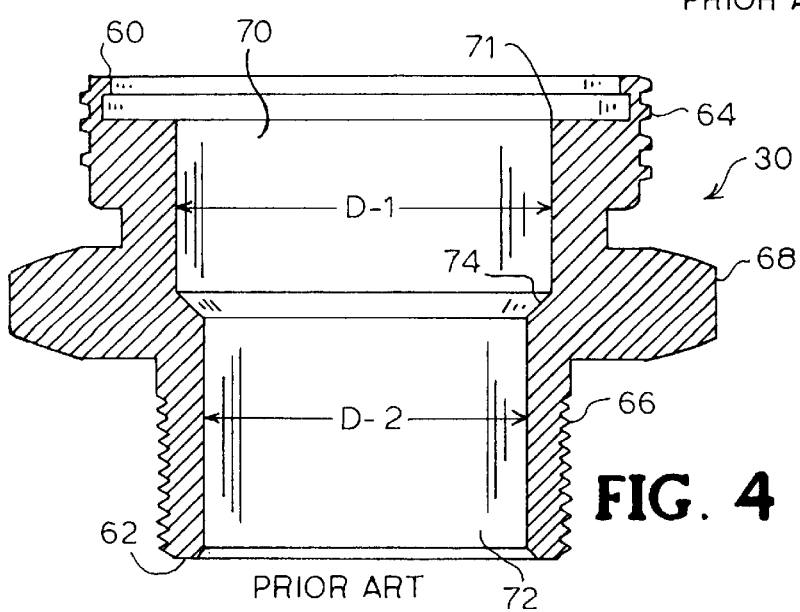
FIG. 4 is a cross-sectional view taken along line 4—4 of FIG. 3.
Figure 8:
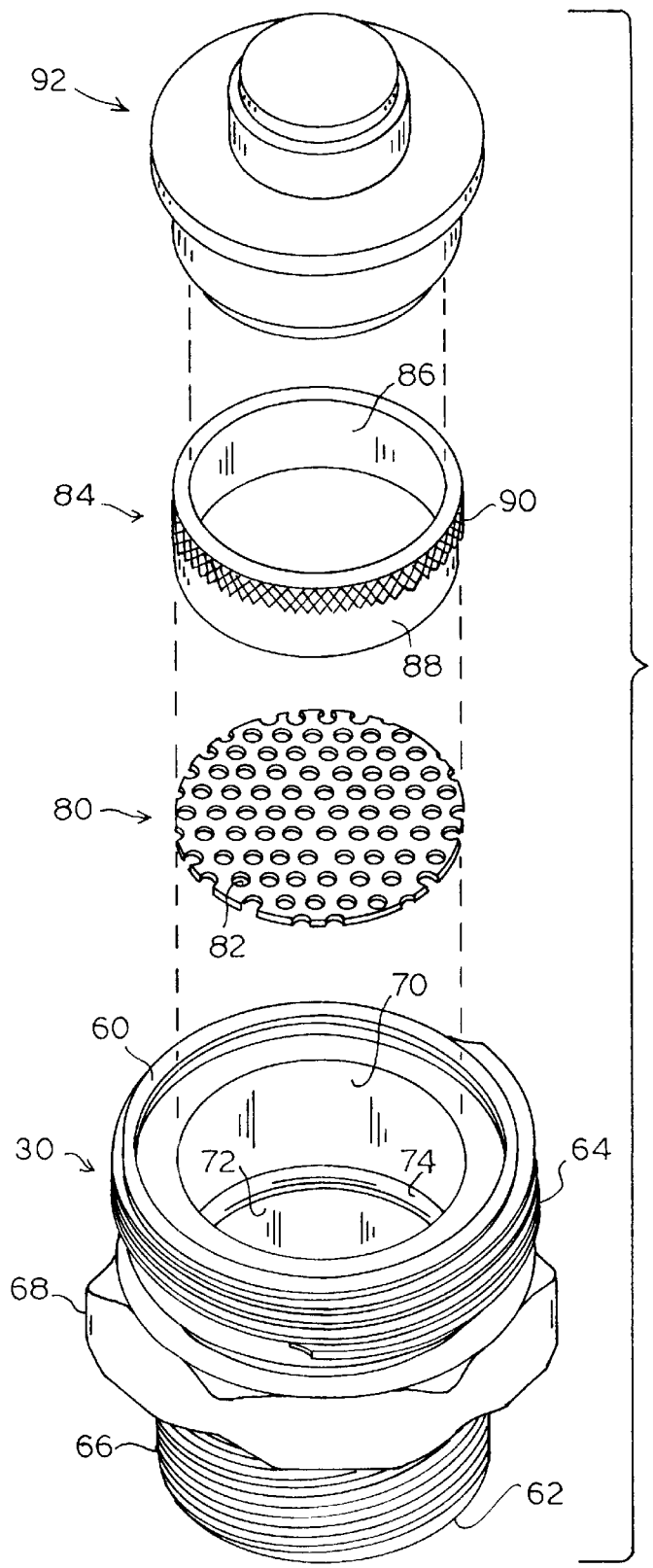
FIG. 8 is an exploded view of the conventional Acme connector with the perforated strainer disc, retainer ring and setting tool of the invention positioned for the installation sequence used for securing the strainer disc inside of the Acme connector.
Figure 12:
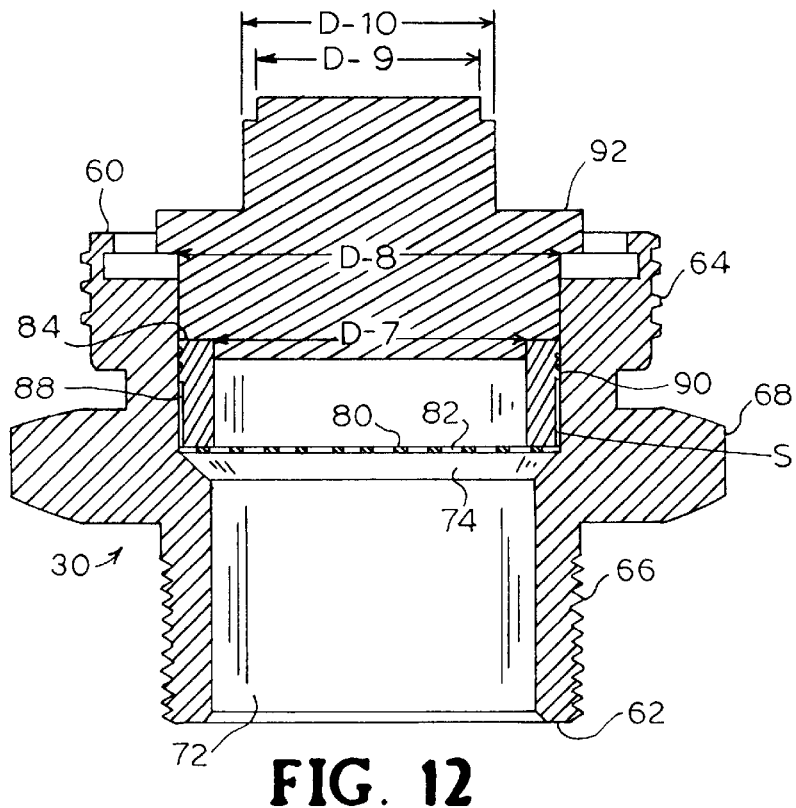
FIG. 12 is a cross-sectional view taken along line 12—12 of FIG. 11 showing the position of the setting tool after pressing the strainer disc into its final position within the Acme connector counterbore where it rests on the upper edge of the inwardly sloping connector surface.
Figure 13:
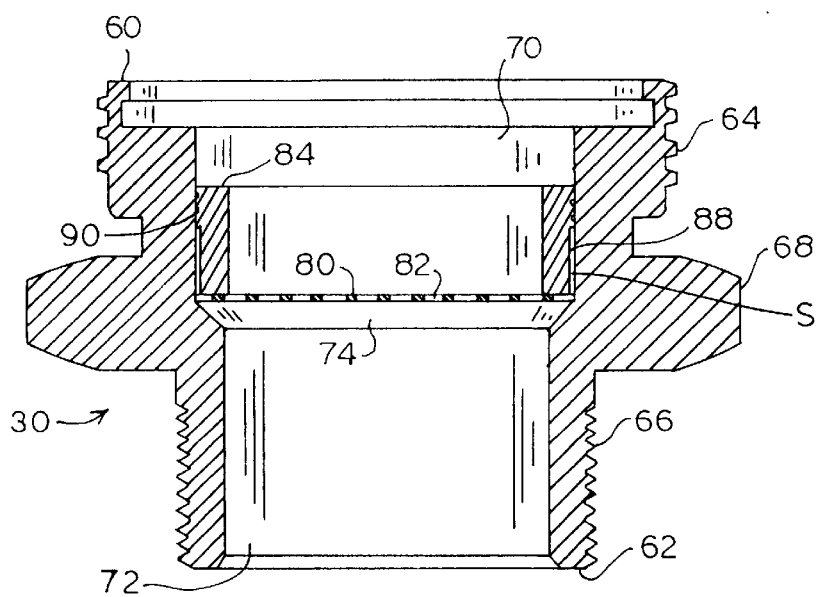
FIG. 13, is a cross-sectional view also taken along line 12—12 of FIG. 11 with the setting tool removed and showing the perforated strainer disc and the retainer ring press fitted within the Acme connector and ready to be put in service.

FIG. 8 is an exploded view of the Acme connector 30, disc 80, retainer ring 84, and setting tool 92. The diameter D-6 of the disc 80 is slightly less than the diameter D-1 of counterbore 70, but is approximately the same as the external diameter D-4 of the smooth surface portion of the retainer ring 84. To assemble the strainer apparatus of the invention, the disc 80 is first placed on the outer most edge of the sloping planar surface 74 (FIG. 4) of the Acme connector 30. Second, the smooth surface portion 88 of the retainer ring 84 is placed within the first counter bore 70 of the Acme connector 30 until substantially all of the outer, smooth surface portion 88 of the retainer ring 84 is within the first counterbore 70 and substantially all of the adjoining outer knurled surface portion 90 of the retainer ring 84 lays against and outside of the top edge 71 (FIG. 4) of the first counterbore 70 as shown in FIG. 9. Third, the setting tool 92 is placed on top of the retainer ring 84 adjacent the outer knurled surface portion 90 of the retainer ring 84 as shown in FIG. 10 and with the portion of setting tool 92 defined by diameter D-7 resting with the portion of retainer ring 84 defined by its inner diameter D-3. Fourth, a downward force is applied to the top of the setting tool 92 thereby forcing the portion of setting tool 92 defined by diameter D-8 to enter the first counterbore 70 (FIGS. 11 and 12) and the outer knurled portion 90 of the retainer ring to engage the smooth surface portion of the first counterbore 70 in the Acme connector 30 (FIG. 11). The bottom surface 85 (FIG. 7) of the retainer ring 84 is thus pressed against the disc 80 and permanently holds the disc 80 against the outermost edge of the inwardly sloping planar surface 74 of the Acme connector 30 (FIG. 12). Once the retainer ring 84 is firmly in position within the Acme connector 30 as in FIG. 12, the setting tool 92 is removed and the outer knurled portion 90 of the retainer ring 84 remains firmly engaged against the internal surface of the first counterbore 70 in the Acme connector 30. The bottom surface of the retainer ring 84 permanently presses against the disc 80 and secures the disc 80 against the sloping planar surface 74 of the Acme connector 30 (FIG. 13) which is now ready for service.

In service, the Acme connector 30 typically experiences ambient temperatures within the range of 0° F. to 100° F. Thus, the choice of stainless steel for disc 80 and aluminum for retainer ring 84 provide coefficients of expansion compatible with the use of brass to form Acme connector 30 and the expected range of operating temperatures. Thus, the disc 80 once installed, can be expected to remain permanently positioned as the operating temperatures fluctuate.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention as set forth in the appended claims.

What is claimed is:

1. A fluid flow metallic pipe coupling and strainer apparatus comprising:
   (a) an intake end having a first internally smooth surfaced cylindrical counterbore;
   (b) an exhaust end having a second internal smooth surfaced cylindrical counterbore concentric with and of less diameter than that of said first counterbore;
   (c) an inwardly sloping annular planar surface located between and serving to connect said first counterbore with said second counterbore;
   (d) outer threaded portions surrounding said intake and exhaust ends enabling said coupling intake and exhaust ends to be connected to respective mating threadably fitted gas hoses leading to respective gas transport and storage tanks;
   (e) a flat, rigid perforated circular metallic disc of a diameter selected to enable said disc to be loosely but closely fitted within said first counterbore at an inner end thereof and immediately adjacent said sloping annular planar surface;
   (f) annular metallic ring of uniform width substantially less than the length of said first counterbore, of uniform thickness and of uniform internal diameter and having on an outer surface thereof a first outer smooth surface portion having an external diameter selected so as to permit a close sliding fit between the inner surface of said first counterbore and the said annular ring outer smooth surface portion and outwardly of said first outer smooth surface portion of said annular ring a second outer knurled surface portion having an external diameter at least slightly in excess of the internal diameter of said first counterbore so as to permit said annular ring prior to being press fitted within said first counterbore to be stopped from fully entering said first counterbore by said knurled surface portion engaging an outer edge surface surrounding said first counterbore at said intake end; and (g) said knurled surface portion being formed so as to enable said annular ring to be press fitted within said first counterbore and positioned so as to secure said annular ring within said first counterbore, against said disc and with said disc residing on said sloping planar surface.

2. A fluid flow pipe coupling and strainer apparatus as claimed in claim 1 wherein the metallic material of which coupling, disc and ring are made exhibit coefficients of expansion compatible with the range of operating temperature experienced by said coupling when in service whereby to maintain said disc suitably secured throughout said range of temperature.

3. A fluid flow pipe coupling and strainer apparatus as claimed in claim 2 wherein said coupling is made of brass, said disc is made of stainless steel and said ring is made of aluminum.

4. A fluid flow pipe coupling and strainer apparatus as claimed in claim 1 including a setting tool for applying said force and wherein said setting tool is formed with an annular cylindrical protrusion adapted to loosely fit within said annular ring and extending outwardly from a body portion of said tool having a bearing surface adapted to engage the portion of said ring to which said force is applied.

5. A fluid flow pipe coupling and strainer apparatus as claimed in claim 4 wherein said setting tool is adapted to be used with couplings of two different sizes, a said protrusion and bearing surface being formed on opposite sides of said tool, each such said protrusion and bearing surface being adapted to fit a particular size of said annular ring.

6. A fluid flow metallic pipe coupling and strainer apparatus comprising:

(a) an intake end having a first internally smooth surfaced cylindrical counterbore;

(b) an exhaust end having a second internal smooth surfaced cylindrical counterbore concentric with and of less diameter than that of said first counterbore;

(c) an internal sloping annular planar surface located between and serving to connect said first counterbore with said second counterbore;

(d) outer threaded portions surrounding said intake and exhaust ends enabling said coupling intake and exhaust ends to be connected to respective mating threadably fitted gas hoses leading to respective gas transport and storage tanks;

(e) a flat, rigid perforated circular metallic disc of a diameter selected to enable said disc to be loosely but closely fitted within said first counterbore at an inner end thereof and immediately adjacent said sloping annular planar surface;

(f) an annular metallic ring of uniform width substantially less than the length of said first counterbore, of uniform thickness and of uniform internal diameter and having on an outer surface thereof a first outer smooth surface portion having an external diameter selected so as to permit a close sliding fit between the inner surface of said first counterbore and the said annular ring outer smooth surface portion and outwardly of said first outer smooth surface portion of said annular ring a second outer knurled surface portion having an external diameter at least slightly in excess of the internal diameter of said first counterbore so as to permit said annular ring prior to being press fitted within said first counterbore to be stopped from fully entering said first counterbore by said knurled surface portion engaging an outer edge surface surrounding said first counterbore at said intake end;

(g) said knurled surface portion being formed so as to enable said annular ring to be press fitted within said first counterbore and positioned so as to secure said annular ring within said first counterbore, against said disc and with said disc residing on said sloping planar surface;

(h) the metallic material of which said coupling, disc and ring are made being selected to exhibit coefficients of expansion compatible with the range of operating temperature experienced by said coupling when in service whereby to maintain said disc suitably secured throughout said range of temperature; and (i) a setting tool for applying a force to effect said press fit of said ring within said first counterbore and formed on one side of a body portion of said tool with an annular cylindrical protrusion adapted to loosely fit within one size of said annular ring associated with one size of said first counterbore and extending outwardly from a body portion of said tool having a bearing surface adapted to engage the portion of said ring to which said force is applied and on an opposite side of the body portion of said tool a similar protrusion and bearing surface associated with another size of said ring and first counterbore.

* * * * *